United States Patent [19]

Kamiya

[11] 4,241,361
[45] Dec. 23, 1980

[54] TUNING VOLTAGE DISPLAY DEVICE FOR A COLOR TELEVISION RECEIVER WITH AN ELECTRONIC TUNER

[75] Inventor: Masanori Kamiya, Yokohama, Japan

[73] Assignee: Hitachi, Ltd., Japan

[21] Appl. No.: 21,200

[22] Filed: Mar. 16, 1979

[30] Foreign Application Priority Data

Mar. 20, 1978 [JP] Japan .................................. 53/32124

[51] Int. Cl.³ ........................ H04N 5/50; H04N 9/62
[52] U.S. Cl. ..................................... 358/10; 358/192.1
[58] Field of Search ...................... 358/10, 40, 192.1; 455/159

[56] References Cited

FOREIGN PATENT DOCUMENTS 1086741 8/1960 Fed. Rep. of Germany ........ 358/192.1

OTHER PUBLICATIONS

"Funkschau", Heft. 20, pp. 51–53, 1975.

Primary Examiner—Robert L. Richardson
Attorney, Agent, or Firm—Craig and Antonelli

[57] ABSTRACT

The display device uses a diode to control an associated primary color output transistor so that a specific color is intensely reproduced. A diode is associated with each of three primary color output transistors which provide an output for switching in accordance with received bands of television signals. These associated switches are provided between the electronic tuner and the power source for the circuitry. The diode associated with each primary color output transistor is on-off controlled by a pulse so a predetermined pulse width is generated following the termination of a period responsive to the magnitude of the tuning voltage which starts from the time at which the horizontal blanking pulse is generated. Because of the generation of the controlling pulse at the horizontal synchronization, a vertically extending bar or stripe is reproduced in the specified color in accordance with the reception band.

7 Claims, 3 Drawing Figures

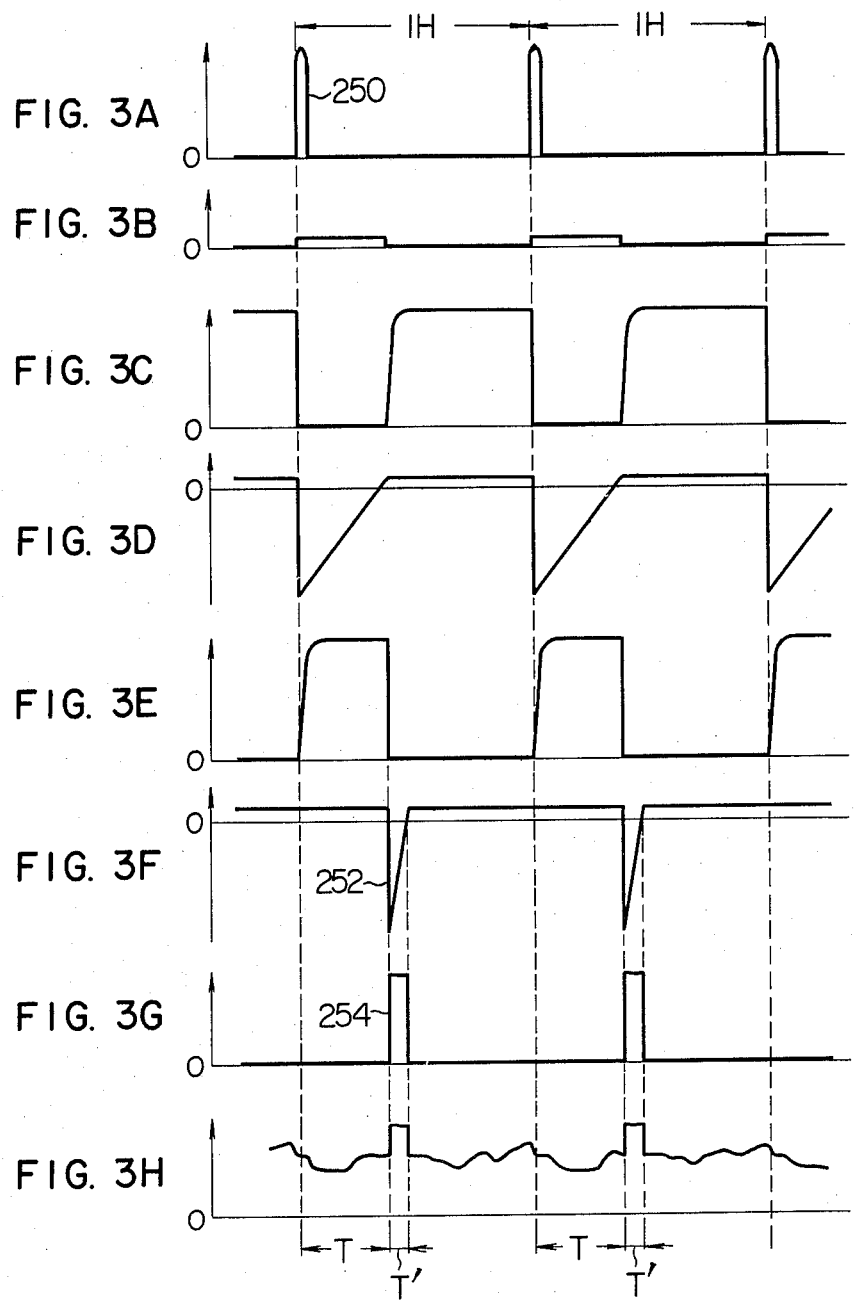

TUNING VOLTAGE DISPLAY DEVICE FOR A COLOR TELEVISION RECEIVER WITH AN ELECTRONIC TUNER

BACKGROUND OF THE INVENTION

1. Field of the Invention

This invention relates to a tuning voltage display device for a color television receiver with an electronic tuner whose tuning voltage is displayed on the screen.

2. Description of the Prior Art

In a television receiver with an electronic tuner, it is necessary to display a tuning voltage together with a reception band for the purpose of displaying a channel to be selected. "Funkschau", Heft 20, pp 51–53, 1975, issued on Sept. 26, 1975 discloses an example of a tuning voltage display wherein a channel number of the lowermost channel of a reception band such as a VHF band or a UHF band is displayed on a screen at the lefthand end of the middle horizontal line across the screen while a channel number of the uppermost channel is displayed at the righthand end, and horizontal bars, whose lengths vary with tuning voltages, are displayed between the displayed channel numbers. Although this type of receiving channel display on the screen is very useful in that no additional display elements are required and the display per se is large and easy to observe, it necessitates a complicated and expensive circuit which is designed to display the reception band in the form of a figure or character. In addition, since all the figures representative of the reception bands are displayed in a single color, i.e., green, it is necessary to read the figures in order to identify the reception bands. This required reading of the figures is often difficult.

SUMMARY OF THE INVENTION

An object of this invention is to provide a tuning voltage display device for use with an electronic tuner which can display a channel to be received on the screen of a color television receiver with a simple circuit.

In order to accomplish the above object, in the present invention, a color television receiver with an electronic tuner in which patterns varying with tuning voltages are generated and at least a portion of the patterns such as a bar or a stripe is color varied in accordance with the reception bands.

BRIEF DESCRIPTION OF THE DRAWINGS

FIGS. 3A to 3H are diagrams showing voltage waveforms appearing at principal points A to H in the circuit of FIG. 1, respectively.

DESCRIPTION OF THE PREFERRED EMBODIMENT

Figure 1:
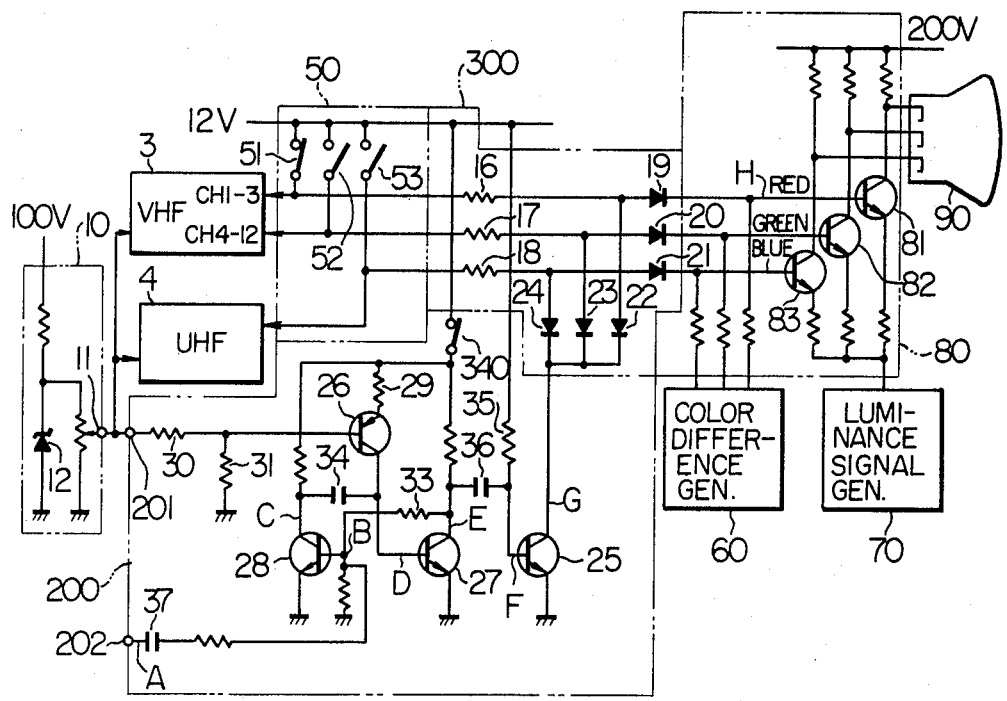
FIG. 1 is a circuit diagram of a tuning voltage display device for a color television receiver with an electronic tuner embodying the invention.
Figure 2:
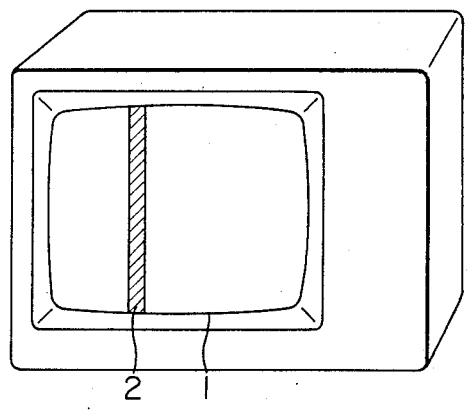
FIG. 2 is a diagrammatic representation showing a pattern generated in accordance with a tuning voltage.

Referring to FIG. 1, an embodiment of the present invention will be described by way of example in connection with the TV broadcasting system in Japan. In FIG. 1, a VHF electronic tuner 3 and a UHF electronic tuner 4 are supplied with an operating voltage through switches 51, 52 and 53 of a band selector 50 which are switched on or off in accordance with the reception bands. The VHF electronic tuner 3 is connected with the two band selector switches 51 and 52 since the VHF receiving band is divided into a low band (1 to 3 channels) and a high band (4 to 12 channels). The VHF electronic tuner 3 is ready for the reception of low or high VHF band with the closure of switch 51 or 52, and when the switch 53 is switched on, the UHF electronic tuner 4 is ready for the reception of UHF band. A tuning voltage generator 10 generates at its output 11 a DC voltage which is variable between zero and a value corresponding to a breakdown voltage of a Zener diode 12. This DC voltage, serving as a tuning voltage, is applied to the VHF and UHF electronic tuners 3 and 4 and also to an input terminal 201 of a pattern generator 200. The pattern generator 200 operates to generate a vertically extending bar 2 to be displayed on a screen 1 of a color picture tube 90, as shown in FIG. 2, and to determine the horizontal position of the bar 2 in accordance with the magnitude of the tuning voltage applied to the input terminal 201. The bar 2 is also controlled in color by a color setting unit 300 such that red, green and blue colors may correspond to the low VHF band, high VHF band and UHF band, respectively. It should be appreciated that such components as the color difference signal generator 60, the luminance signal generator 70, and the primary color signal generator 80, which subjects a signal from the color difference generator 60 representative of a color difference between red, green and blue to a matrix operation with a luminance signal from the luminance signal generator 70 as well as the color picture tube 90, the VHF and UHF electronic tuners 3 and 4, the band selector 50 and the tuning voltage generator 10 are each similar to those of an ordinary color television receiver with an electronic tuner.

When the switch 51 is turned on, that is, the low VHF band is being received, a resistor 16 and diodes 19 and 22 serve as a gate circuit, which is enabled and disabled in response to turning off and on of a transistor 25, respectively. A circuit constituted by a resistor 17 and diodes 20 and 23 serves as a gate circuit when the switch 52 is turned on, that is, when the high VHF band is being received. Similarly, a circuit constituted by a resistor 18 and diodes 21 and 24 serves as a gate circuit when the switch 53 is switched on, that is, when the UHF band is being received. Primary color output transistors 81, 82 and 83 are strongly biased only when the gate circuits connected to their respective bases are enabled. For example, in the illustrated case of receiving the low VHF band, when the transistor 25 is turned off to turn on the diode 19, a base current of the red output transistor 81 increases so that red color is strongly reproduced. At the same time, the diodes 20 and 21 connected to the green output transistors 82 and the blue output transistor 83 remain turned off even with the transistor 25 turned off because the switches 52 and 53 are turned off. In other words, in this case base currents of the green output transistor 82 and blue output transistor 83 are not influenced by turning on-off of the transistor 25. The period during which the transistor 25 is turned off takes place during a period for scanning the bar 2 so that the bar 2 is colored in red, green and blue when receiving the low VHF, high VHF and UHF bands, respectively. Except for the stripe 2, an ordinary picture is reproduced in accordance with signals received at the tuners 3 and 4.

A circuit comprising transistors 26 to 28 constitutes a monostable multivibrator circuit which determines a horizontal position at which the bar 2 is displayed on the screen. This circuit is essentially that of a usual monostable multivibrator if the transistor 26 and a resistor 29 are replaced by a single resistor. Accordingly, in the absence of a trigger input applied to an input terminal 202, this monostable multivibrator is held stable with the transistor 27 turned on and the transistor 28 cut off. The transistor 26 constitutes a constant current circuit whose current value is controlled by the tuning voltages for the electronic tuners 3 and 4. The magnitude of current flowing through the transistor 26 is determined by the resistance of resistor 29, a voltage (+12 V) on a power supply line and a fractional voltage established by dividing the tuning voltage by resistors 30 and 31. The higher the tuning voltage becomes, the higher the base potential of the transistor 26 becomes, so that the collector current of the transistor 26 decreases. Conversely, the lower the tuning voltage becomes, the more the collector current of the transistor 26 increases. If the collector current of transistor 26 for the maximum tuning voltage is set to a base current of the transistor 27 which is sufficient to saturate the same by selecting constants of the circuit, the transistor 27 conducts irrespective of the magnitude of the tuning voltage and hence, the monostable multivibrator is held stable with transistor 27 turned on and transistor 28 cut off in the absence of the trigger pulse. When a horizontal blanking pulse, such as the trigger pulse with the horizontal scanning, is received, the circuit will operate as described below with reference to FIGS. 3A to 3H which respectively illustrate voltage waveforms, at the horizontal synchronization, at principal points A to H in the picture display circuit shown in FIG. 1. A voltage waveform at the input terminal 202 is illustrated in FIG. 3A, base and collector voltage waveforms of the transistor 28 in FIGS. 3B and 3C, respectively, base and collector voltage waveforms of the transistor 27 in FIGS. 3D and 3E, respectively, base and collector voltage waveforms of the transistor 25 in FIGS. 3F and 3G, respectively, and a base voltage waveform of the red output transistor 81 in FIG. 3H. When the trigger pulse designated by 250 in FIG. 3A, taking the form of the horizontal blanking pulse, is received by the input terminal 202, the transistor 28 which has been cut off is turned on. As a result, the collector potential (FIG. 3C) of the transistor 28 is decreased to decrease the base potential (FIG. 3D) of the transistor 27, rendering it cut off. The transistor 27 rendered cut off raises its collector potential (FIG. 3E), so that the base current of the transistor 28 is passed therethrough via a resistor 33. Accordingly, even after disappearance of the horizontal blanking pulse 250, the transistors 28 and 27 are kept conductive and nonconductive, respectively. The aforementioned operation commences as soon as the trigger input is applied. The base potential of the transistor 27 having rapidly fallen to a negative potential as shown in FIG. 3D gradually increases as a capacitor 34 begins to discharge via the constant current circuit comprising the transistor 26. Then, the base potential of the transistor 27 changes negative to positive and eventually, it reaches a base voltage (usually, about 0.7 V) sufficient to render the transistor 27 conductive. At the same time, the collector potential (FIG. 3E) of the transistor 27 decreases. Concurrently with the decrease in the collector potential of transistor 27, the base current of the transistor 28 is stopped so that the collector voltage (FIG. 3C) of the transistor 28 begins to increase, thereby causing the capacitor 34 to be charged via the base of the transistor 27. In this manner, the transistor 27 is rendered conductive instantaneously. The period, during which the transistor 27 is being cut off, is determined by a discharge rate of the capacitor 34, that is, by the magnitude of current flowing through the constant current circuit comprising the transistor 26. Thus, the higher the value of the tuning voltage, the smaller the constant current circuit current becomes, thereby prolonging the period T.

The waveform shown in FIG. 3E is differentiated by a capacitor 36 and a resistor 35, producing a negative pulse 252 as shown in FIG. 3E. Accordingly, a positive pulse 254 as shown in FIG. 3G appears at the collector of the transistor 25 which in turn controls switching of the gate circuit. The positive pulse 254 develops immediately after the off-period T of the transistor 27 terminates. Therefore, the higher the tuning voltage becomes, the longer the positive pulse 254 is delayed. Since the negative pulse 252 has a pulse width which is determined by a time constant determined by the capacitance of capacitor 36 and the resistance of resistor 35, the positive pulse 254 also has a constant pulse width T' which is determined by that time constant. In this manner, the transistor 25 is rendered non-conductive for the constant period T' following the termination of the period T responsive to the magnitude of tuning voltage which starts from the time at which the horizontal blanking pulse 250 is generated.

In the illustration of FIG. 1, since the switch 51 for the reception of the low VHF band is switched on and the switches 52 and 53 are turned off, the diode 19 is rendered conductive during the period T' and hence, the red output transistor 81 is strongly biased during the same period, thereby reproducing an intense red color. The period T' takes place at the horizontal synchronization so that the intensive red color reproduction is effected at the horizontal synchronization, giving rise to the vertically extending bar 2 in red. In addition, because of the delayed generation of period T' responsive to the magnitude of the tuning voltage, the higher the tuning voltage becomes, the more the horizontal position of bar 2 is biased to the right side.

When receiving the high VHF band, the switch 52 is on and the diode 20 is on at the horizontal synchronization, displaying the bar 2 in green. When receiving the UHF band, the switch 53 is turned on and the diode 22 is on at the horizontal synchronization, displaying the bar 2 in blue.

It should be understood that a switch 340 of the pattern generator 200 is adapted to erase the tuning voltage display and with switching-off of this switch 340, the transistor 25 is always rendered conductive and the diodes 19, 20 and 21 are always rendered non-conductive.

The embodiment of FIG. 1 is so constructed as to display red, green and blue bars in accordance with different reception bands but a modification may easily be achieved which displays the bars colored in colors other than red, green and blue. For example, by providing a diode whose anode is connected to the anode of diode 19 and whose cathode is connected to the base of green output transistor 82, the bar 2 may be displayed in yellow when receiving the low VHF band.

It is also possible to use a vertical blanking pulse in place of the horizontal blanking pulse 250 applied to the input terminal 202. In such a modification, by increasing capacitances of the capacitors 34, 36 and 37 such that they match the vertical period, it is possible to display a horizontally extending bar whose vertical position shifts in accordance with the magnitude of the tuning voltage. The shifting bar pattern may be other patterns such as stripes exhibiting different colors in accordance with the reception bands.

Furthermore, various types of circuit may be used for determining the period T in accordance with the magnitude of the tuning voltage. An exemplary circuit may comprise an integrating circuit for converting the horizontal blanking pulse into a sawtooth waveform voltage, a superimposing circuit for removing a DC component of the sawtooth voltage delivered from the integrating circuit and thereafter superimposing a pure sawtooth voltage on a DC voltage which is variable in accordance with the magnitude of the tuning voltage, a reference voltage source, and a pulse generator circuit comparing an output voltage from the superimposing circuit with the reference voltage to produce a pulse at an instant that the output voltage of the superimposing circuit crosses the reference voltage.

Furthermore, where the invention is applied to a complex receiver set having in combination an electronic tuning type radio receiver and an electronic tuning type color television receiver, it is also possible to display the tuning voltage of the radio receiver in a similar manner.

I claim:

1. A tuning voltage display device for a color television receiver having a plurality of electronic tuners of different reception bands comprising:
   (a) band designating means for selectively energizing one of said electronic tuners corresponding to a reception band in which a program channel to be received is included,
   (b) tuning voltage generating means for producing different dc potentials corresponding to tuning voltages for receiving respective program channels and supplying a designated one of said tuning voltages to an appropriate one of said electronic tuners,
   (c) color picture reproducing means having a color picture screen,
   (d) driver means responsive to color information for generating a color picture signal for driving said color picture reproducing means,
   (e) pattern generator means, coupled between said tuning voltage generator means and said driver means, and having a pulse generator which generates a pattern control pulse of a desired width delayed from the occurrence of a blanking pulse of said receiver for a period of time corresponding to the magnitude of said tuning voltage, said control pulse controlling said driver means to cause said color picture reproducing means to generate a pattern signal which is variable with said tuning voltage, and
   (f) color generator means coupled between said band designating means and said driver means, and having gates controlled by said pattern control pulse, said band designating means energizing a corresponding one of said gates in accordance with the designated band, and said gate controlling said driver means to cause said color picture reproducing means to generate a color signal which is variable in accordance with said designated band.

2. A tuning voltage display device according to claim 1 wherein said color generator means comprises bias setting means for applying to said driver means a bias voltage which is variable in accordance with the band designated by said band designating means.

3. A tuning voltage display device according to claim 2 wherein said bias setting means comprises a control terminal connected to said pattern generator means and an input terminal, a DC power source, and connecting means coupled between the input terminal of the respective gates controlled by said pattern control pulse and the DC power source, said connecting means connecting the input terminal of one of said gates selected in accordance with the designated band to said DC power source.

4. In a color television receiver having:
   (1) a tuner having (a) band selection means for selecting any one of a plurality of frequency bands each of which includes a plurality of channels and (b) channel selection means for selecting one of said plurality of channels in said one frequency band selected by said band selection means;
   (2) color signal generating means for generating a color picture signal representative of a color television signal in said one channel selected by said channel selection means in said selected one frequency band; and
   (3) reproducing means for reproducing a color picture representative of said color picture signal on a color screen, the improvement comprising:
      (i) color pattern signal generating means supplied with outputs of said band selection means and said channel selection means for producing a color pattern signal which is supplied to said color signal generating means and mixed with said color picture signal, so that the thus mixed signal output of said color signal generating means causes said reproducing means to reproduce on said color screen a reproduced color picture as well as a color pattern whose color and pattern are representative of said selected one frequency band and said selected one channel, respectively.

5. A tuning channel display device for a color television receiver having (1) tuning means which has a band selection means for selecting any one of a plurality of frequency bands each of which includes a plurality of channels and (a) channel selection means for producing a DC voltage to select any one of said plurality of channels in said one frequency band selected by said band selection means, the value of which DC voltage is corresponding to said selected one channel, for producing a color television signal in said selected one channel in said selected one frequency band; (2) drive means for producing a color picture signal representative of said color television signal; and (3) color display means for reproducing a color picture representative of said color picture signal on a color screen; said display device comprising:
   (i) a pattern signal generator supplied with said DC voltage for generating a pattern signal to cause said color display means to reproduce on said color screen a pattern portion whose position is corresponding to said DC voltage, and
   (ii) control means supplied with said pattern signal and the output of said band selection means for causing said drive means to put in a color representative of said output to said pattern portion reproduced on said color screen.

6. A tuning channel display device according to claim 5, wherein said drive means comprises a plurality of amplifiers for amplifying a primary color signal and wherein said control means supplies said pattern signal from said pattern signal generator to at least one of said plurality of amplifiers which is selected in response to said output of said band selection means.

7. A tuning channel display device according to claim 6 wherein said control means comprises a plurality of gate means each of which is connected between said pattern signal generator and each amplifier, at least one of said plurality of gate means and the others being opened and closed, respectively, in response to said output of said band selection means.

* * * * *